United States Patent
Brandt et al.

(10) Patent No.: US 9,965,619 B2
(45) Date of Patent: *May 8, 2018

(54) RETURN ADDRESS OVERFLOW BUFFER

(71) Applicant: Intel Corporation, Santa Clara, CA (US)

(72) Inventors: Jason W. Brandt, Austin, TX (US); Vedvyas Shanbhogue, Austin, TX (US); Baiju V. Patel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 282 days.

This patent is subject to a terminal disclaimer.

(21) Appl. No.: 14/798,134

(22) Filed: Jul. 13, 2015

(65) Prior Publication Data

US 2017/0017791 A1    Jan. 19, 2017

(51) Int. Cl.
*G06F 21/56* (2013.01)
*G06F 21/52* (2013.01)

(52) U.S. Cl.
CPC ................ *G06F 21/52* (2013.01)

(58) Field of Classification Search
CPC .................................................. G06F 21/52
See application file for complete search history.

(56) References Cited

U.S. PATENT DOCUMENTS

| | | | | |
|---|---|---|---|---|
| 6,301,699 B1* | 10/2001 | Hollander | ........... | G06F 21/55 717/131 |
| 9,015,835 B2* | 4/2015 | Gerzon | ........... | G06F 21/52 726/22 |
| 2003/0217277 A1* | 11/2003 | Narayanan | ........... | G06F 21/52 713/187 |
| 2014/0173293 A1* | 6/2014 | Kaplan | ........... | G06F 21/54 713/190 |

* cited by examiner

*Primary Examiner* — Baotran N To
(74) *Attorney, Agent, or Firm* — Nicholson De Vos Webster & Elliott LLP

(57) ABSTRACT

Embodiments of an invention for a return address overflow buffer are disclosed. In one embodiment, a processor includes a stack pointer to store a reference to a first return address stored on a stack, an obscured address stack pointer to store a reference to an encrypted second return address stored in a memory, hardware to decrypt the encrypted second return address to generate a decrypted second return address, and a return address verification logic, responsive to receiving a return instruction, to compare the first return address to the decrypted second return address.

14 Claims, 3 Drawing Sheets

Method 300

RETURN ADDRESS OVERFLOW BUFFER

BACKGROUND

1. Field

The present disclosure pertains to the field of information processing, and more particularly, to the field of security in information processing systems.

2. Description of Related Art

The security of an information processing system may be compromised by an attack that maliciously takes advantage of a processor's support of control flow transfers. For example, various return address corrupting techniques may be employed by malicious software for carrying out a return-oriented programming (ROP) attack. ROP is a method of hijacking the execution flow of the current process by exploiting a return instruction which, in many processor architectures, retrieves from the top of a procedure stack the address of the next instruction to be executed, usually being the instruction following the corresponding call instruction within the calling routine. By modifying the return address on the stack, an attacker can divert the execution flow of the current process to a deviant memory location.

An attacker may use a variety of techniques to corrupt the stack, which is referred to as stack pivoting. For example, when a legitimate software routine uses the stack as an input buffer, the stack may be corrupted by maliciously supplying more input data than the routine is expecting to receive.

BRIEF DESCRIPTION OF THE FIGURES

The present invention is illustrated by way of example and not limitation in the accompanying figures.

DETAILED DESCRIPTION

Figure 1:
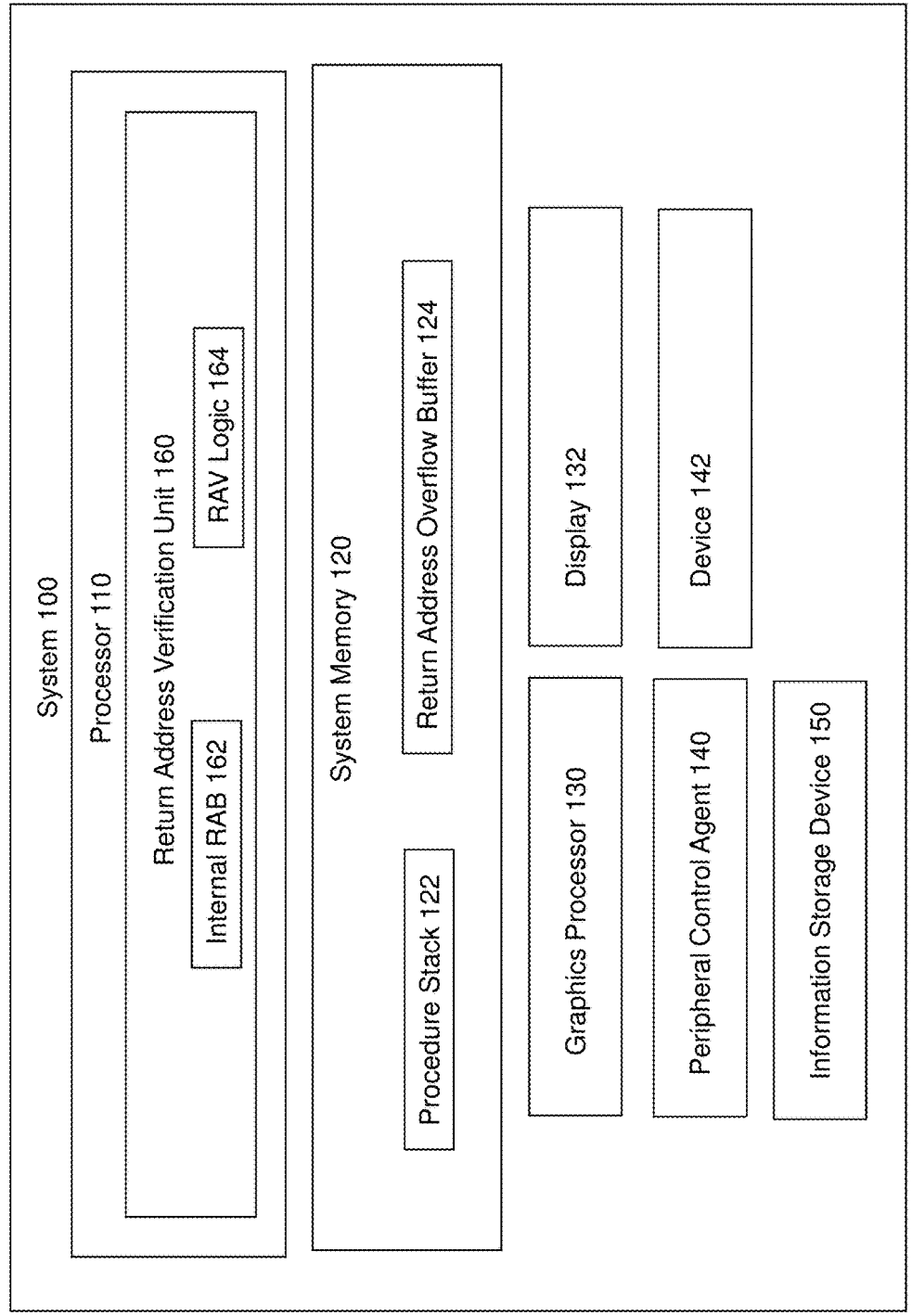
FIG. 1 illustrates a system including a return address overflow buffer according to an embodiment of the present invention.

Embodiments of an invention for a return address overflow buffer are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, as used in descriptions of embodiments of the present invention, a "/" character between terms may mean that an embodiment may include or be implemented using, with, and/or according to the first term and/or the second term (and/or any other additional terms).

As described in the background section, return-oriented programming (ROP) attacks may hijack a processor's execution flow by corrupting a procedure stack on which return addresses may be stored. Therefore, the use of embodiments of the present invention may be desired to mitigate vulnerability to this type of attack. In an embodiment, to prevent unauthorized stack modification, an information processing system may maintain a return address buffer (which may also be referred to as a shadow stack) designed to redundantly store, along with a procedure stack, procedure return addresses. In response to receiving a call instruction, a processor in the system may place the return address both onto the stack and into the return address buffer. The return address buffer may include a first portion internal to the processor and a second portion within a system memory. The second portion may be encrypted in order to prevent an attacker from manipulating or otherwise using it to specify a return address to which a ROP attack may be successfully launched because an attacker-supplied value would be decrypted into an unusable return address, triggering a fault or crash. In addition or instead, the second portion may include message authentication codes, hash values, or other authentication values that may be used to determine whether the return addresses have been modified.

In an embodiment, in response to receiving a return instruction, the processor may retrieve and return to the return address from the return address buffer. In another embodiment, in response to receiving a return instruction, the processor may retrieve and compare the return addresses from the stack and the return address buffer, and, if the two addresses match, continue executing the return instruction; otherwise, the processor may generate an exception, thus preventing a potential attacker from hijacking the execution flow of the current process.

FIG. 1 illustrates system 100, an information processing system including an embodiment of the present invention for a return address overflow buffer. System 100 may represent any type of information processing system, such as a server, a desktop computer, a portable computer, a set-top box, a hand-held device such as a tablet or a smart phone, or an embedded control system. System 100 includes processor 110, system memory 120, graphics processor 130, peripheral control agent 140, and information storage device 150. Systems embodying the present invention may include any number of each of these components and any other components or other elements, such as peripherals and input/output devices. Any or all of the components or other elements in this or any system embodiment may be connected, coupled, or otherwise in communication with each other through any number of buses, point-to-point, or other wired or wireless interfaces or connections, unless specified otherwise. Any components or other portions of system 100, whether shown in FIG. 1 or not shown in FIG. 1, may be integrated or otherwise included on or in a single chip (a system-on-a-chip or SOC), die, substrate, or package.

System memory 120 may be dynamic random access memory or any other type of medium readable by processor 110. System memory 120 may be used to store procedure stack 122 and return address overflow buffer 124, as further described below.

Graphics processor 130 may include any processor or other component for processing graphics data for display 132. Peripheral control agent 140 may represent any component, such as a chipset component, including or through which peripheral, input/output (I/O), or other components or devices, such as device 142 (e.g., a touchscreen, keyboard, microphone, speaker, other audio device, camera, video or other media device, network adapter, motion or other sensor, receiver for global positioning or other information, etc.) and/or information storage device 150, may be connected or coupled to processor 110. Information storage device 150 may include any type of persistent or non-volatile memory or storage, such as a flash memory and/or a solid state, magnetic, or optical disk drive.

Processor 110 may represent one or more processors or processor cores integrated on a single substrate or packaged within a single package, each of which may include multiple threads and/or multiple execution cores, in any combination. Each processor represented as or in processor 110 may be any type of processor, including a general purpose microprocessor, such as a processor in the Intel® Core® Processor Family or other processor family from Intel® Corporation or another company, a special purpose processor or microcontroller, or any other device or component in an information processing system in which an embodiment of the present invention may be implemented. Processor 110 may be architected and designed to operate according to any instruction set architecture, with or without being controlled by microcode.

Processor 110 includes return address verification unit 160 to support a return address overflow buffer according to an embodiment of the present invention. Return address verification unit 160 may include internal return address buffer 162 and return address verification control logic 164, each as described below. In an embodiment in which processor 110 is a multicore processor, return address verification unit 160 or any portion thereof and/or return address overflow buffer 124 may be shared between or among cores. Although embodiments of the present invention are described with reference to processor 110 in information processing system 100, the present invention may be embodied in any type of processor and/or system.

Figure 2:
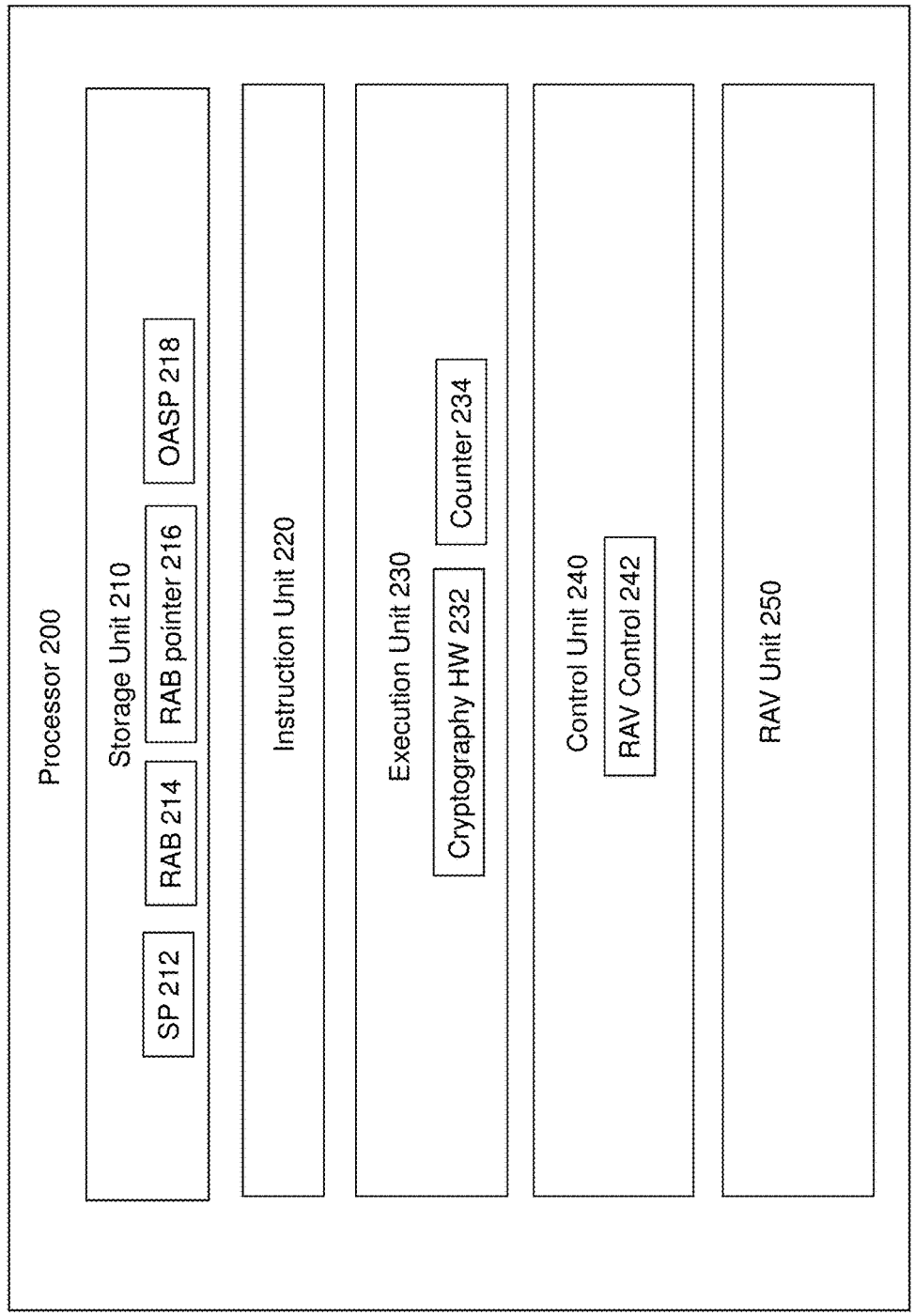
FIG. 2 illustrates a processor supporting a return address overflow buffer according to an embodiment of the present invention.

FIG. 2 illustrates processor 200, which may represent an embodiment of processor 110 in FIG. 1 or an execution core of a multicore processor embodiment of processor 110 in FIG. 1. Processor 200 may include storage unit 210, instruction unit 220, execution unit 230, control unit 240, and return address verification unit 250, where return address verification unit may represent an embodiment of return address verification unit 160 in FIG. 1. Each such unit is shown as a single unit for convenience; however, the circuitry of each such unit may be combined within and/or distributed throughout processor 200 according to any approach. For example, various portions of return address verification unit may be physically integrated into storage unit 210, instruction unit 220, execution unit 240, and/or control unit 250, for example, as may be described below. Processor 200 may also include any other circuitry, structures, or logic not shown in FIG. 1.

Storage unit 210 may include any combination of any type of storage usable for any purpose within processor 200; for example, it may include any number of readable, writable, and/or read-writable registers, buffers, and/or caches, implemented using any memory or storage technology, in which to store capability information, configuration information, control information, status information, performance information, instructions, data, and any other information usable in the operation of processor 200, as well as circuitry usable to access such storage and/or to cause or support various operations and/or configurations associated with access to such storage.

In an embodiment, storage unit 210 may include stack pointer 212, which may be a register or portion of a register or other storage location for storing a pointer or other reference to a procedure stack, such procedure stack 122 of FIG. 1, upon which return addresses for control transfers may be stored. The stack may in a system memory such as system memory 120. In other embodiments, a processor may be implemented without a stack pointer, for example, in an embodiment in which a procedure stack is stored in internal memory of the processor.

In an embodiment, storage unit 210 may include internal return address buffer 214, which may correspond to internal return address buffer 162 of FIG. 1. Internal return address buffer 214 may represent any type of storage within processor 200 in which to redundantly store all or a portion of the content, such as return addresses, of a procedure stack such as procedure stack 122, as further described below. In various embodiments, processor 200 may include multiple internal return address buffers (e.g., for multiple privilege levels as described below). In embodiments with one or more internal return address buffers, any one or more may be dedicated for use in return address verification, and/or any one or more may also be used as a branch prediction buffer.

In an embodiment, storage unit 210 may include return address buffer pointer 216, which may be a register or portion of a register or other storage location for storing a pointer or other reference to an entry or element of internal return address buffer 214 (and/or return address overflow buffer 124), as further described below.

In an embodiment, storage unit 210 may include obscured address stack pointer (OASP) 218, which may be a register or portion of a register or other storage location for storing a pointer or other reference to an entry or element of return address overflow buffer 124, as further described below.

Instruction unit 220 may include any circuitry, logic, structures, and/or other hardware, such as an instruction decoder, to fetch, receive, decode, interpret, schedule, and/or handle instructions to be executed by processor 200. Any instruction format may be used within the scope of the present invention; for example, an instruction may include an opcode and one or more operands, where the opcode may be decoded into one or more micro-instructions or micro-operations for execution by execution unit 230. Operands or other parameters may be associated with an instruction implicitly, directly, indirectly, or according to any other approach.

Instruction unit 220 may be designed to receive instructions to support control flow transfers. For example, a first instruction (e.g., a call instruction or CALL) may be used to transfer control to an entry point of a procedure or code sequence, where the procedure or code sequence includes a second instruction (e.g., a return instruction or RET) to transfer control back to the calling code sequence (or other procedure or code sequence). In connection with the execution of a call instruction, the return address (e.g., the address of the instruction following the call instruction in the calling procedure) and/or the parameters being passed to a procedure may be stored in a data structure, such as procedure stack 122. Stack 122 may be implemented as a linear array following a "last in-first out" (LIFO) access paradigm.

Instruction unit 220 may be designed to receive instructions to access the stack. In an embodiment, the stack grows towards lesser memory addresses. Data items may be placed on the stack using a PUSH instruction and retrieved from the stack using a POP instruction. To place a data item on the stack, processor 200 may modify (e.g., decrement) the value of a stack pointer (e.g., stack pointer 212) and then copy the data item into the memory location referenced by the stack pointer. Hence, the stack pointer always references the top-most element of the stack. To retrieve a data item from the stack, processor 200 may read the data item referenced by the stack pointer, and then modify (e.g., increment) the value of the stack pointer so that it references the element which was placed on the stack immediately before the element that is being retrieved.

As introduced above, execution of a call instruction may include pushing the return address onto the stack. Accordingly, processor 200 may, prior to branching to the entry point in the called procedure, push the address stored in an instruction pointer register onto the stack. This address, also referred to as the return instruction pointer, points to the instruction where execution of the calling procedure should resume following a return from the called procedure. When executing a return instruction within the called procedure, processor 200 may retrieve the return instruction pointer from the stack back into the instruction pointer register, and thus resume execution of the calling procedure.

However, processor 200 may not require that the return instruction pointer point back to the calling procedure. Prior to executing the return instruction, the return instruction pointer stored in the stack may be manipulated by software (e.g., by executing a PUSH instruction) to point to an address other than the address of the instruction following the call instruction in the calling procedure. Manipulation of the return instruction pointer may be allowed by processor 200 to support a flexible programming model; however, it may also create a potential vulnerability to ROP attacks.

Execution unit 230 may include any circuitry, logic, structures, and/or other hardware, such as arithmetic units, logic units, floating point units, shifters, etc., to process data and execute instructions, micro-instructions, and/or micro-operations. Execution unit 230 may represent any one or more physically or logically distinct execution units.

Execution unit 230 may also include cryptographic hardware 232 to implement any one or more cryptographic algorithms, such as an Advanced Encryption Standard (AES) algorithm in electronic code book (ECB), counter (CTR), and/or cipher block chaining (CBC) mode. Alternatively, encryption and decryption may be performed by other hardware (e.g., shared, general-purpose hardware) in execution unit 230.

Control unit 240 may include any microcode, firmware, circuitry, logic, structures, and/or hardware to control the operation of the units and other elements of processor 200 and the transfer of data within, into, and out of processor 200. Control unit 240 may cause processor 200 to perform or participate in the performance of method embodiments of the present invention, such as the method embodiments described below, for example, by causing processor 200, using execution unit 230 and/or any other resources, to execute instructions received by instruction unit 220 and micro-instructions or micro-operations derived from instructions received by instruction unit 220. The execution of instructions by execution 230 may vary based on control and/or configuration information in storage unit 210.

In an embodiment, control unit 240 may include return address verification control logic 242, which may correspond to return address verification control logic 164 of FIG. 1, to control the use, by processor 200, of internal return address buffer 214 and return address overflow buffer 124, and the return address verification operations of embodiments of the present invention.

Return address verification unit 250 may represent internal return address buffer 214, return address buffer pointer 216, OASP 218, return address verification control logic 242, and/or other circuitry, logic, structure, and/or hardware to mitigate vulnerability to ROP attacks. In an embodiment, in addition to storing the return instruction pointer on the stack, as described above, execution of a call instruction by processor 200 may include storing the return instruction pointer in a return address buffer, such as internal return address buffer 214. Then, in connection with receiving a return instruction within the called procedure, processor 200 may retrieve and compare the return instruction pointers from the stack and from the return address buffer. If the two addresses match, processor 200 may continue to execute the return instruction; otherwise, processor 200 may generate an exception. In another embodiment, the return instruction pointer retrieved from the return address buffer may be used without a comparison.

In an embodiment, the return address buffer may be implemented in a combination of storage within processor 200 (e.g., internal return address buffer 214) and storage external to processor 200 (e.g., return address overflow buffer 124). The external storage may be used as an overflow buffer in the event that the internal storage becomes full. In various embodiments, the external storage (e.g., return address overflow buffer 124) may also be used to store initialization vectors, authentication codes, integrity check values, anti-replay values, and/or other values as desired to add security or other features. In various embodiments, OASP adjustments and look-ahead operations may include a consideration of the size of not only return addresses, but also of these other values. In various embodiments, unused (e.g., upper) bits of the return address values may be used for these other values or portions of these other values.

To protect an attacker from successfully launching a ROP attack by manipulating or otherwise using return addresses stored external to processor 200, they may be encrypted. In an embodiment, each return address to be stored externally may be encrypted before being stored in return address overflow buffer 124. Each return address removed from return address overflow buffer 124 may be decrypted before being used or compared to the corresponding return address from the stack.

In other embodiments, in response to internal return address buffer 214 becoming filled beyond a certain threshold (e.g., 75%, 50%, etc.), any size portion (e.g., the oldest half) of internal return address buffer 214 may be encrypted and written out to return address overflow buffer 124. Similarly, in response to internal return address buffer 214 being emptied beyond a certain threshold (e.g., 25%, 50%, etc.), any size portion (e.g., half the size of internal return address buffer 214) of return address overflow buffer 124 may be decrypted and loaded into internal return address buffer 214.

The encryption and decryption of return addresses may be performed by cryptographic hardware 232 and may use an encryption key embedded in processor 200. In an embodiment, the return addresses may be encrypted in AES-ECB mode. In another embodiment, processor 200 may include counter 234, which may be used to encrypt the return addresses in AES-CTR mode to provide protection against an attacker reading out the encrypted values, mapping them to corresponding return addresses in the stack, and rearranging them to set up a ROP attack. In another embodiment, the return addresses may be encrypted in AES-CBC mode, and initialization vectors used for the encryption and decryption may also be stored in return address overflow buffer 214.

In an embodiment, return address buffer overflow functionality may be implemented by initializing return address buffer pointer 216 to point to the base of internal return address buffer 214, and modified (e.g., decremented) in connection with a CALL, when a new return address is written into the return address buffer. When the boundary of internal return address buffer 214 is reached, the next pointer modification operation may cause return address buffer pointer 216 to point to the base of return address overflow buffer 124. Therefore, new return addresses may be written, after encryption, into return address overflow buffer 124 instead of internal return address buffer 214.

In this embodiment, in connection with a RET, if return address buffer pointer 216 is pointing to return address overflow buffer 124, a return address may be removed from encrypted return address overflow buffer 124 and decrypted, and return address buffer pointer 216 may be incremented until the boundary of encrypted return address overflow buffer 124 is reached. Then, the next pointer modification operation may cause return address buffer pointer 216 to point to internal return address buffer 214 (the most recently added entry) instead of to return address overflow buffer 124.

In another embodiment, return address buffer pointer 216 may be used only for internal return address buffer 214, and OASP 218 may be used for return address overflow buffer 124. Then, when any size of encrypted data is written into or removed from return address overflow buffer 124, the OASP may be adjusted by the amount written or removed. (For convenience, the use of the term OASP may also refer to a combined pointer when pointing to return address overflow buffer 124).

To prevent page faults, deadlocks, and other issues when writing to or reading from address overflow buffer 124 (or when changing privilege levels, as described below), processor 200 may look ahead and prepare for one or more new OASP values in advance. For example, each time the OASP is adjusted, processor 200 may calculate a range of OASP values beyond the adjusted value, walk the page tables (including extended page tables used to support virtual machines) for each anticipated value, and signal any faults, violations, misconfigurations, or other exceptions. If no such faults or exceptions are raised, or after any such faults or exceptions are handled (e.g., by bringing a missing page into system memory 210), the physical memory addresses represented by the anticipated OASPs may be cached within processor 200 in preparation for the next write to or read from address overflow buffer 124.

In an embodiment in which processor 200 supports multiple privilege levels, processor 200 may include separate OASPs for each privilege level. In connection with each privilege level change, the content of internal return address buffer 214 may be encrypted and written out to address overflow buffer 124 using the OASP corresponding to the old privilege level (i.e., the privilege level before the change).

In an embodiment, internal return address buffer 214 may then be flushed so that it may be used for return addresses at the new privilege level (i.e., the privilege level after the change). In another embodiment, processor 200 may include multiple internal return address buffers (e.g., one per privilege level), and only empty those corresponding to the lower privilege levels (e.g., less privileged than the highest privilege level) on a context switch or translation lookaside buffer invalidation. In another embodiment, processor 200 may include a privilege level tag in each entry in the internal return address buffer so that it can be written out to the return address overflow buffer using the correct OASP. In this embodiment, all entries corresponding to a lower privilege level (e.g., less privileged than the highest privilege level) are written out on a context switch or translation lookaside buffer invalidation. Each of these various embodiments, and/or others, may be used with or without the use of an encrypted return address overflow buffer.

Additionally, processor 200 may provide a mechanism for state of the one or more OASP, as well as the counter, if any, used for AES-CTR, to be saved and restored (along with other processor state) in connection with context switch, for example, through the use of state saving and restoring instructions.

Figure 3:
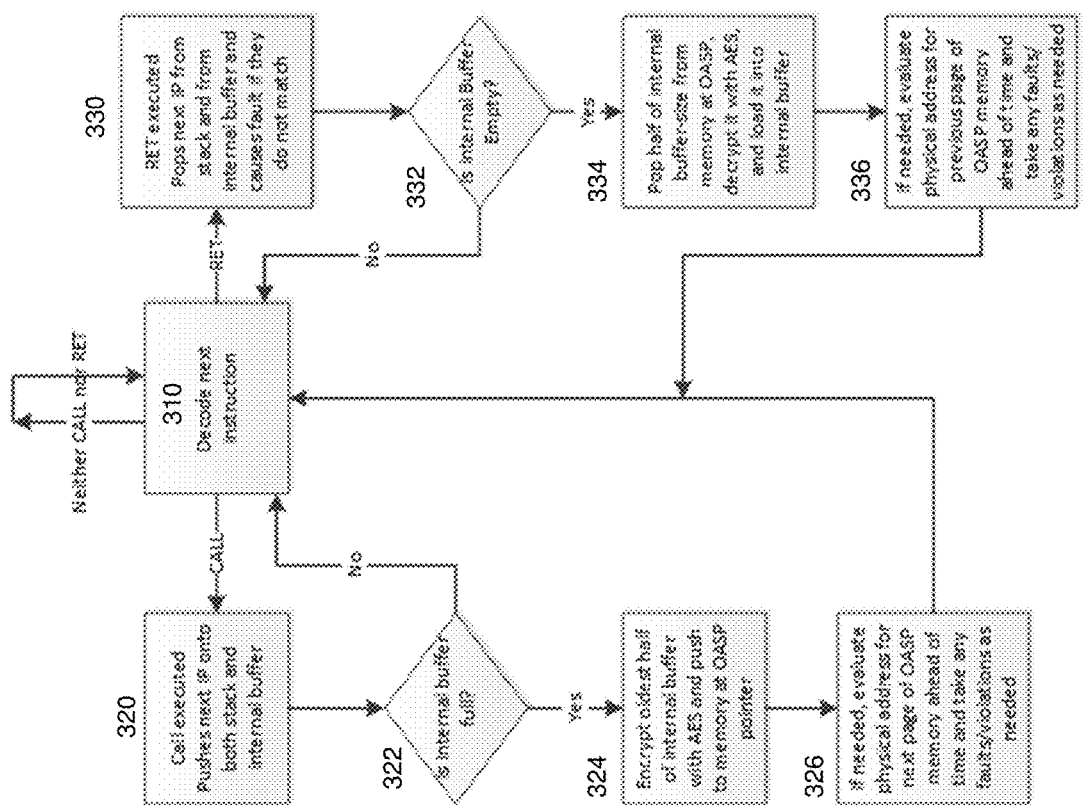
FIG. 3 illustrates a method for using a return address overflow buffer according to an embodiment of the present invention.

FIG. 3 illustrates method 300 for using a return address overflow buffer according to an embodiment of the present invention. Although method embodiments of the invention are not limited in this respect, reference may be made to elements of FIGS. 1 and 2 to help describe the method embodiment of FIG. 3. Various portions of method 300 may be performed by hardware, firmware, software, and/or a user of a system or device.

In box 310 of method 300, a processor (e.g., processor 200) may decode a next instruction. If the next instruction is not a CALL or a RET, method 300 continues in box 310. However, if the next instruction is a CALL, method 300 continues in box 320, or if the next instruction is a RET, method 300 continues in box 330.

In box 320, execution of the CALL includes pushing the next instruction pointer (IP) onto both a stack (e.g., stack 122) and an internal return address buffer (e.g., internal return address buffer 214). In box 322, a determination is made as to whether the internal return address buffer is full. If not, method 300 continues in box 310; if so, method 300 continues in box 324.

In box 324, a portion (e.g., the oldest half) of the internal return address buffer is encrypted (e.g., with AES) and pushed to external memory at the location specified by the OASP, and the OASP is adjusted according to the amount written.

In box 326, an OASP look-ahead operation is performed. Various embodiments of an OASP look-ahead operation are possible within the scope of the invention, with the goal of avoiding page faults, deadlock, and or other issues in connection with a subsequent access to a return address overflow buffer, a subsequent privilege level change, subsequent nested CALLs, or any other event that may use a subsequent OASP value. In an embodiment, a cache of pre-translated OASP values may be maintained. Any range or number of pre-translated OASPs may be used (e.g., OASP−4K, OASP, and OASP+4K), potentially chosen based on the size of various memory ranges used by page tables, extended page tables, memory type range registers, etc., and/or potentially chosen based on conditions under which faults are to be avoiding (e.g., OASP−4K might not be cached if a fault on a RET to further fill a partially filled internal return address buffer is acceptable). Each time an OASP is adjusted (e.g., in box 324), the cache may be updated by looking ahead (and/or looking back) to one or more anticipated OASP values, walking the page tables (including extended page tables and/or any other memory address translation structures), signaling/raising and handling any faults in advance, and caching any new (i.e., not already cached) address translations that may be used to avoid potential faults, deadlocks, and/or other issues.

From box 326, method 300 continues in box 310.

In box 330, execution of the RET includes popping the next IP both from the stack and from the internal return address buffer and causes a fault if they do not match. In box 332, a determination is made as to whether the internal return address buffer is empty. If not, method 300 continues in box 310; if so, method 300 continues in box 334.

In box 334, a portion (e.g., the newest half) of the internal return address buffer is encrypted (e.g., with AES) and pushed to external memory at the location specified by the OASP, and the OASP is adjusted according to the amount written. In box 326, a portion of memory (e.g., half the size of internal return address buffer 214) is popped from the location specified by the OASP, decrypted, and loaded into the internal return address buffer, and the OASP is adjusted according to the amount loaded.

In box 336, an OASP look-ahead operation, as described above, is performed. From box 336, method 300 continues in box 310.

In various embodiments of the present invention, the method illustrated in FIG. 3 may be performed in a different order, with illustrated boxes combined or omitted, with additional boxes added, or with a combination of reordered, combined, omitted, or additional boxes.

For example, in an embodiment, box 330 may be replaced by popping the next IP only from the internal return address buffer and using it (after performing boxes 332 and potentially 334 and 336) to execute the RET. For example, in another embodiment, boxes 326 and or 336 may be performed under certain conditions (e.g., when an OASP is within a certain threshold of a page or other boundary) and omitted under other conditions (e.g., when an OASP is at least a certain threshold away from a page or other boundary)

Furthermore, method embodiments of the present invention are not limited to method 300 or variations thereof. Many other method embodiments (as well as apparatus, system, and other embodiments) not described herein are possible within the scope of the present invention.

For example, an embodiment of the present invention may be used in a processor that includes internal storage, such as a register, instead of a procedure stack, for one or more return addresses. In such an embodiment, return addresses from the internal return address buffer may be used instead of or compared to return addresses from the internal storage.

Embodiments or portions of embodiments of the present invention, as described above, may be stored on any form of intangible or tangible machine-readable medium. For example, all or part of method 300 may be embodied in software or firmware instructions that are stored on a tangible medium readable by processor 110, which when executed by processor 110, cause processor 110 to execute an embodiment of the present invention. Also, aspects of the present invention may be embodied in data stored on a tangible or intangible machine-readable medium, where the data represents a design or other information usable to fabricate all or part of processor 110.

Thus, embodiments of an invention for a return address overflow buffer have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A hardware processor, comprising:
a stack pointer to store a reference to a first return address stored on a stack;
an internal return address buffer;
a return address buffer pointer to store a reference to the internal return address buffer;
an obscured address stack pointer to store a reference to an encrypted second return address stored in a memory;
hardware to decrypt the encrypted second return address to generate a decrypted second return address; and
a return address verification logic, responsive to receiving a return instruction, to compare the first return address to the decrypted second return address and to determine whether the internal return address buffer is below a threshold, and, responsive to determining that the internal return address buffer is below the threshold, pop one or more encrypted return addresses from a memory location referenced by the obscured address stack pointer, decrypt the encrypted return addresses to generate decrypted return addresses, and load the decrypted return addresses into the internal return address buffer.

2. The hardware processor of claim 1, wherein the return address verification logic is also to execute the return instruction responsive to determining that the first return address is equal to the decrypted second return address.

3. The hardware processor of claim 1, wherein the return address verification logic is also to generate a stack fault exception responsive to determining that the first return address differs from the decrypted second return address.

4. The hardware processor of claim 1, wherein the return address verification logic is also, responsive to receiving a call instruction, to store a return address on the stack, to encrypt the return address to generate an encrypted return address, and to store the encrypted return address in a memory external to the processor.

5. A hardware processor, comprising:
a stack pointer to store a reference to a first return address stored on a stack;
an internal return address buffer;
a return address buffer pointer to store a reference to the internal return address buffer;
an obscured address stack pointer to store a reference to an encrypted second return address stored in a memory;
hardware to decrypt the encrypted second return address to generate a decrypted second return address; and
a return address verification logic, responsive to receiving a call instruction, to compare the first return address to the decrypted second return address and to determine whether the internal return address buffer is above a threshold and, responsive to determining that the internal return address buffer is above the threshold, encrypt one or more return addresses from the internal return address buffer to generate encrypted return addresses, and push the encrypted return addresses to a memory location referenced by the obscured address stack pointer.

6. A hardware processor, comprising:
a stack pointer to store a reference to a first return address stored on a stack;
an internal return address buffer;
a return address buffer pointer to store a reference to a second return address in the internal return address buffer;
an obscured address stack pointer to store a reference to a return address overflow buffer;
a cache of anticipated obscured address stack pointer translations; and
logic to determine whether the internal address buffer is filled above or below a threshold, and, in response to determining that the internal address buffer is filled above or below a threshold, move content between the internal return address buffer and the return address overflow buffer, adjust the obscured address stack pointer, and determine whether to update the cache of anticipated obscured address stack pointer translations.

7. A method, comprising:
receiving, by a processor, a return instruction;
decrypting an encrypted return address referenced by an obscured address stack pointer to generate a decrypted return address;
comparing a return address referenced by a stack pointer to the decrypted return address;
responsive to receiving the return instruction, determining whether an internal return address buffer is below a threshold; and,
responsive to determining that the internal return address buffer is below the threshold, popping one or more encrypted return addresses from a memory location referenced by the obscured address stack pointer, decrypting the encrypted return addresses to generate decrypted return addresses, and loading the decrypted return addresses into the internal return address buffer.

8. The method of claim 7, further comprising executing the return instruction responsive to determining that the return address is equal to the decrypted return address.

9. The method of claim 7, further comprising generating a stack fault exception responsive to determining that the return address differs from the decrypted return address.

10. The method of claim 7, further comprising, responsive to receiving a call instruction, storing a return address on the stack, encrypting the return address to generate an encrypted return address, and storing the encrypted return address in a memory external to the processor.

11. A method, comprising:
receiving, by a processor, a return instruction;
decrypting an encrypted return address referenced by an obscured address stack pointer to generate a decrypted return address;
comparing a return address referenced by a stack pointer to the decrypted return address; and
responsive to receiving a call instruction, determining whether an internal return address buffer is above a threshold; and,
responsive to determining that the internal return address buffer is above the threshold, encrypting one or more return addresses from the internal return address buffer to generate encrypted return addresses, and pushing the encrypted return addresses to a memory location referenced by the obscured address stack pointer.

12. A system, comprising:
a system memory to store a stack and an encrypted return address overflow buffer;
a processor, including:
a stack pointer to store a reference to a first return address stored on the stack;
an internal return address buffer;
a return address buffer pointer to store a reference to the internal return address buffer;
an obscured address stack pointer to store a reference to an encrypted second return address stored in the encrypted return address overflow buffer;
hardware to decrypt the encrypted second return address to generate a decrypted second return address; and
a return address verification logic, responsive to receiving a return instruction, to compare the first return address to the decrypted second return address and to determine whether the internal return address buffer is below a threshold, and, responsive to determining that the internal return address buffer is below the threshold, pop one or more encrypted return addresses from a memory location referenced by the obscured address stack pointer, decrypt the encrypted return addresses to generate decrypted return addresses, and load the decrypted return addresses into the internal return address buffer.

13. The system of claim 12, wherein the return address verification logic is also to:
execute the return instruction responsive to determining that the first return address is equal to the decrypted second return address, and
generate a stack fault exception responsive to determining that the first return address differs from the decrypted second return address.

14. The system of claim 12, wherein the return address verification logic is also, responsive to receiving a call instruction, to store a return address on the stack, to encrypt the return address to generate an encrypted return address, and to store the encrypted return address in the encrypted return address overflow buffer.

* * * * *